(12) United States Patent
Booker, Jr.

(10) Patent No.: US 7,639,346 B2
(45) Date of Patent: Dec. 29, 2009

(54) NON-CONTACT MEASUREMENT DEVICE

(76) Inventor: Reginald Earl Booker, Jr., 114 SE. 14th St., Deerfield Beach, FL (US) 33441

( * ) Notice: Subject to any disclaimer, the term of this patent is extended or adjusted under 35 U.S.C. 154(b) by 211 days.

(21) Appl. No.: 11/521,026

(22) Filed: Sep. 14, 2006

(65) Prior Publication Data
US 2007/0058155 A1 Mar. 15, 2007

Related U.S. Application Data

(60) Provisional application No. 60/717,123, filed on Sep. 14, 2005.

(51) Int. Cl.
*G01C 3/08* (2006.01)
(52) U.S. Cl. .................. 356/5.02; 356/4.01; 356/152.1
(58) Field of Classification Search .................. 356/4.01
See application file for complete search history.

(56) References Cited

U.S. PATENT DOCUMENTS

| 4,730,190 | A * | 3/1988 | Win et al. .................... 342/118 |
| 5,229,806 | A * | 7/1993 | Takehana ..................... 396/120 |
| 6,522,412 | B2 * | 2/2003 | Norita et al. ................. 356/601 |
| 2003/0112449 | A1 * | 6/2003 | Tu et al. ....................... 356/604 |
| 2003/0218736 | A1 * | 11/2003 | Gogolla et al. ................ 356/3.1 |
| 2004/0028174 | A1 * | 2/2004 | Koren ........................... 378/4 |
| 2004/0051860 | A1 * | 3/2004 | Honda et al. ................ 356/4.01 |
| 2005/0174560 | A1 * | 8/2005 | Imber et al. ................. 356/5.01 |

* cited by examiner

*Primary Examiner*—Thomas H Tarcza
*Assistant Examiner*—Timothy A Brainard
(74) *Attorney, Agent, or Firm*—Robert M. Downey, PA

(57) ABSTRACT

A handheld device is adapted to perform non-contact measurements to determine distances, angles, arc lengths and radii between select points on physical structures. The device is assembled and contained within a handheld, portable housing and includes various control and input keys, a visual display and three laser components. Each laser component includes a laser emitter including a laser emitter diode with an associated emitter lens. The laser emitters of the three laser components are set at fixed, predetermined angles relative to one another at the front end of the housing. Each laser component also includes a laser receiver with an associated detector lens correspondingly positioned in alignment with the emitter lens. The laser components are adapted to emit and receive light signals to collect image data representative of a straight line distance between a predetermined set point within the device and a point on the surface of the measured structure. A processing unit receives the image data from the three laser components to determine straight-line distance measurements. These measurements are used in conjunction with known angles between the three laser emitters to perform calculations that determine distance, angle, arc length and radius of the physical structures.

3 Claims, 8 Drawing Sheets

LASER DISTANCE/ANGLE/RADIUS MEASURER

NON-CONTACT MEASUREMENT DEVICE

This application is based on provisional patent application Ser. No. 60/717,123 filed on Sep. 14, 2005.

BACKGROUND OF THE INVENTION

1. Field of the Invention

The present invention relates to non-contact measuring devices and, more particularly, to a handheld measurement device that uses laser emitter/receiver components and a computer processing unit to perform calculations of distance, angle, arc length and/or the radius between two points.

2. Discussion of the Related Art

Non-contact measurement devices for quickly and accurately obtaining straight-line distance and angle measurements are well known in the related art. These devices typically use one or more light generating components which emit a light signal or pulse through a lens and onto a surface of a structure associated with the desired measurement. Light energy returns from the surface and through the same detector lens or a separate lens. The data collected from the light pulse transmission and return (i.e. receipt) is used to determine straight-line distance, usually based on elapsed time between light pulse transmission and receipt.

Examples of non-contact distance measurement devices are found in U.S. Patents to Ehbets et al., U.S. Pat. No. 5,949,531; Gaechter, U.S. Pat. No. 5,892,576; Hinderling et al., U.S. Pat. No. 6,411,371; and Hertzman et al., U.S. Pat. No. 6,115,112.

Examples of non-contact measurement devices which determine both straight-line distance and angles between two points are found in the U.S. Patents to Pease, U.S. Pat. Nos. 6,593,587, 6,858,857, and 6,858,858.

An example of a non-contact measurement device that determines diameter and radius is found in the U.S. Patent to Gelbart, U.S. Pat. No. 5,291,273. The device in Gelbart is not a handheld device, but uses light emitting devices to project two beams of light through a lens. One beam of light is directed to the center of the object being measured and the other beam is directed at a fixed distance from the first beam. The beams reflect off of the object and the angle between the reflected beams is used to determine the radius.

Despite the extensive knowledge and developments in the art of non-contact measurement using one or more light emitter/receiver devices, there remains an urgent need for a single handheld, compact device which performs non-contact measurements to determine straight-line distance, angle, arc length and/or the radius of a physical structure.

OBJECTS AND ADVANTAGES OF THE INVENTION

With the foregoing in mind, it is a primary object of the present invention to provide a handheld, portable non-contact measuring device which quickly and accurately determines distance, angle, arc length and radius of a physical structure.

It is a further object of the present invention to provide a handheld non-contact measurement device which is adapted to determine straight-line distance between either the front end or back end of the device and a particular point on a physical structure.

It is still a further object of the present invention to provide a handheld non-contact measurement device which is adapted to determine straight-line distance between two points remote from the device, such as the vertical wall height between the floor and ceiling in a building structure.

It is yet a further object of the present invention to provide a handheld non-contact measurement device which is adapted to measure and indicate both inside angles (i.e. less than 180°) between two surfaces and outside angles (greater than 180°) between two surfaces.

It is still a further object of the present invention to provide a handheld non-contact measurement device which quickly and accurately determines the total length of an arch between two points on a surface, the radius of the arc, the total span of the arc and the distance between the center of the span of the arc and the center of the length of the arc.

It is yet a further object of the present invention to provide a handheld non-contact measurement device which quickly and accurately determines the area of a circle and the volume of a cylinder.

SUMMARY OF THE INVENTION

The present invention is directed to a handheld device that is adapted to perform non-contact measurement to determine distances, angles, arc lengths and radii between select points on physical structures. The device is assembled and contained within a handheld, portable housing and includes various control and input keys, a visual display and three laser components. Each laser component includes a laser emitter including a laser emitter diode with an associated emitter lens. The laser emitters of the three laser components are set at fixed, predetermined angles relative to one another at the front end of the housing. Each laser component also includes a laser receiver with an associated detector lens correspondingly positioned in alignment with the emitter lens. The laser components are adapted to emit and receive light signals to collect image data representative of a straight line distance between a predetermined set point within the device and a point on the surface of the measured structure. A processing unit receives the image data from the three laser components to determine straight line distance measurements. These measurements are used in conjunction with known angles between the three laser emitters to perform calculations that determine distance, angle, arc length and radius of the physical structures.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
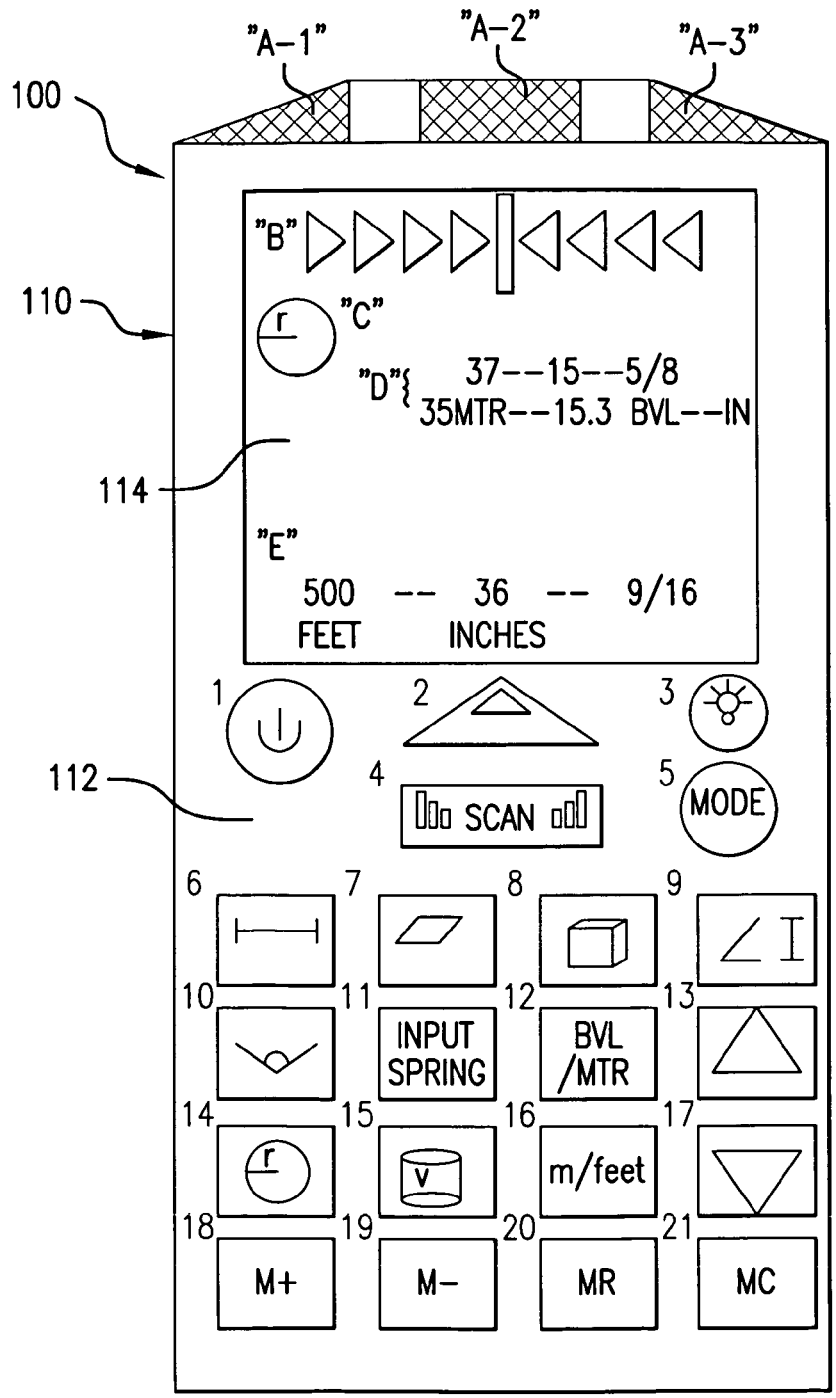
FIG. 1 is a top plan view of the handheld non-contact measurement device, in accordance with a preferred embodiment of the present invention, illustrating an arrangement of control and input elements or keys, and a visual display.
Figure 2:
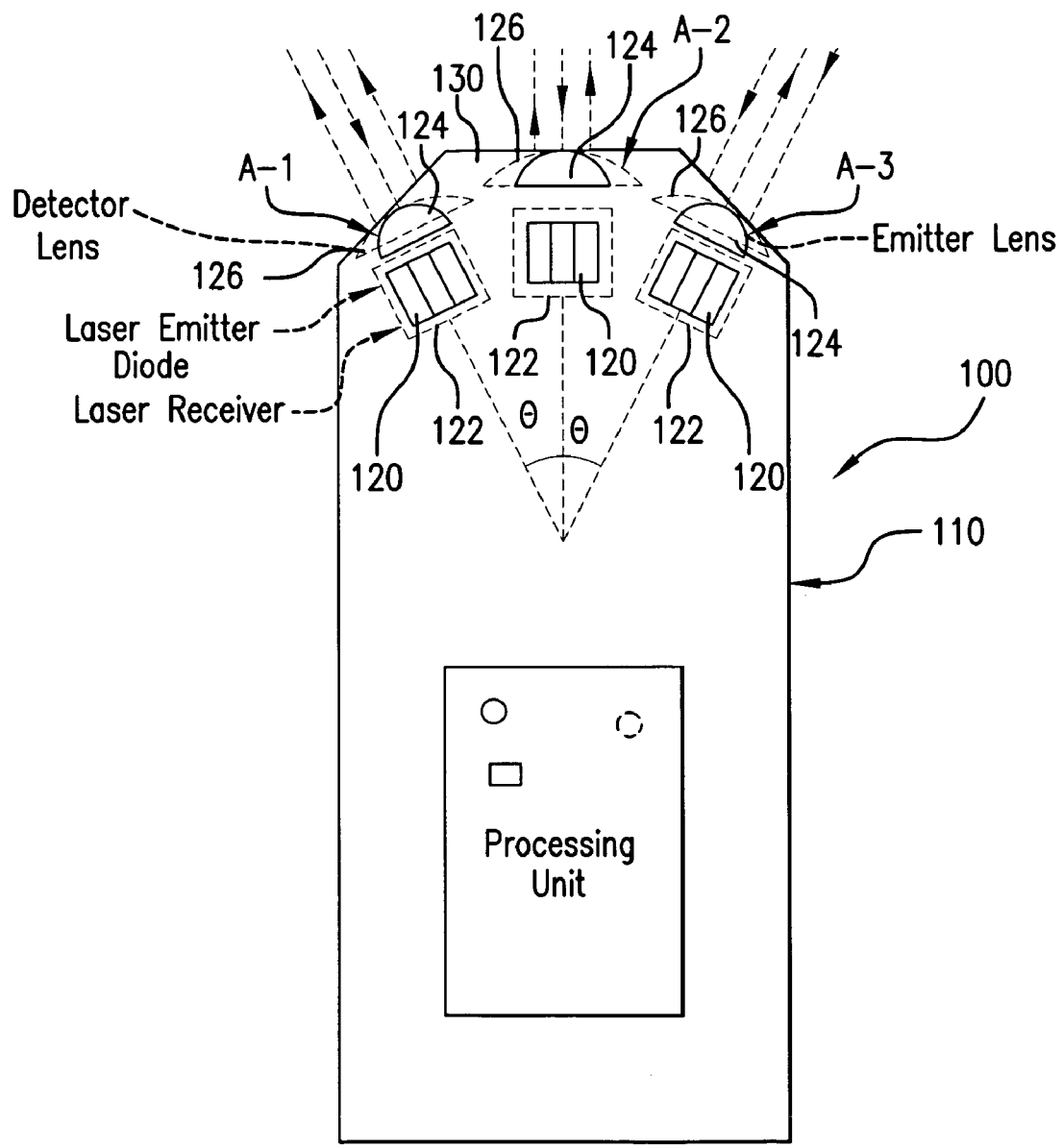
FIG. 2 is a general schematic diagram showing the primary internal components of the non-contact measurement device of FIG. 1.

The present invention is directed to a portable, handheld non-contact measuring device and is generally indicated as 100 throughout the drawings. The electronic components of the device are contained within a housing 110, as generally illustrated in FIGS. 1 and 2. In a preferred embodiment, the top face 112 of the housing 110 presents an arrangement of control and input elements or keys (labeled 1-21) and a visual display 114 such as an LCD panel.

The device uses 3 laser emitter/receiver components labeled A-1, A-2, and A-3. These 3 laser emitter/receiver components are set within the front end 130 of the housing 110 at fixed, predetermined angles relative to one another. Each laser emitter/receiver component includes an associated laser emitter diode 120 for generating a laser light signal and a laser receiver 122 for receiving a returning light signal. Each laser emitter/receiver component A-1, A-2 and A-3 further includes an associated emitter lens 124 and detector lens 126 on the front end 130 of the housing 110.

On the display 114, a centering indicator B directs the user to move the handheld device 100 to the left or to the right in order to find the center of an angle when measuring an angle between two surfaces, or to find the optimal position for radius measurement. The C function symbol on the display indicates the type of measurement being performed (e.g. distance, area, angle, radius, etc). The indicator labeled as D on the display lists recent measurements that have been taken such as linear, area, angle, radius, etc. Using the scroll keys 13 and 17, the user can go back or forward through a list of previously acquired measurements. The display function labeled E shows a current measurement or the sum of two or more saved measurements.

A processor 140 in the housing receives all control commands that are entered by depressing the numerous control keys, and is programmed to perform all measurement calculations based on data received from the return laser light signals. The processor 140 is also programmed to change modes in response to mode control commands entered with the control keys. The processor 140 communicates with all three laser emitter/receiver components A-1, A-2 and A-3 to control generation, emission and receipt of laser light signals, and the processor 140 controls operational functions of the display 114, including transmission of function, mode and measurement data for visual presentation on the display 114.

The control elements or keys on the device are shown in FIG. 1. In particular, power key 1 is used to energize (turn on) and de-energize (turn off) the device. Control key 2 is pressed once for targeting and twice for measuring. Control key 3 operates a backlight on the display 114 for ease of reading the display in low ambient light level conditions. Control key 4 operates a scan mode for continuous beams to find minimum or maximum linear, center angle or optimal radial placement. Control key 5 allows the operator to change modes of operation of the device or to change other control elements/keys to different operation modes. Control key 6 is used to set linear measurement mode. Control key 7 is used to set area measurement mode. Control key 8 operates the cubic volume measurement mode.

When it is desired to determine the straight-line distance between two points, both of which are remote from the device, the device can be changed to a Pythagorean mode using control key 9. For instance, the Pythagorean mode can be used to determine the distance between the base and top of a structure, thereby providing a height measurement. Control key 10 is pressed once to obtain a full angle measurement of a corner formed by two adjacent wall surfaces. Pressing the mode control key 5 and the angle measurement control key 10 provides a measurement for a ½ angle. The mode key 5 can also be used to switch between decimal, degree-minute-second or radian measurement.

When determining the miter or bevel angles of crown moulding, it is necessary to first input the spring angle of the crown moulding using input spring key 12. The bevel/miter control key 12 is used to indicate the miter and bevel angles of, for instance, crown moulding and base board trim.

As previously discussed, control keys 13 and 17 provide for a scroll-up and scroll-down function for indicators on the display.

Control key 14 is pressed once for determining radius measurement. Pressing control key 14 twice provides for diameter measurement. Pressing the mode key 5 simultaneously with control key 14 allows the user to input span (run) of an arc. This allows for a distance measurement of the span to determine the running length of the arc.

Control key 15 is pressed once when measuring the area of a circle and twice to determine the volume of a cylinder. Control key 16 is used in conjunction with mode key 5 to change between measurement units such as decimal feet, feet and inches, and metric units. Control key 18 allows the user to add a current measurement to memory. Control key 19 subtracts a current measurement from memory. Control key 20 is used to recall the sum total of all measurements in memory. Control key 21 allows the user to clear the memory.

While not shown, the device provides for a USB or Bluetooth connection, allowing the user to download measurement information to a computer or PDA. Also, the bottom end of the housing is provided with a tripod mount for vertical measurements.

Figure 3:
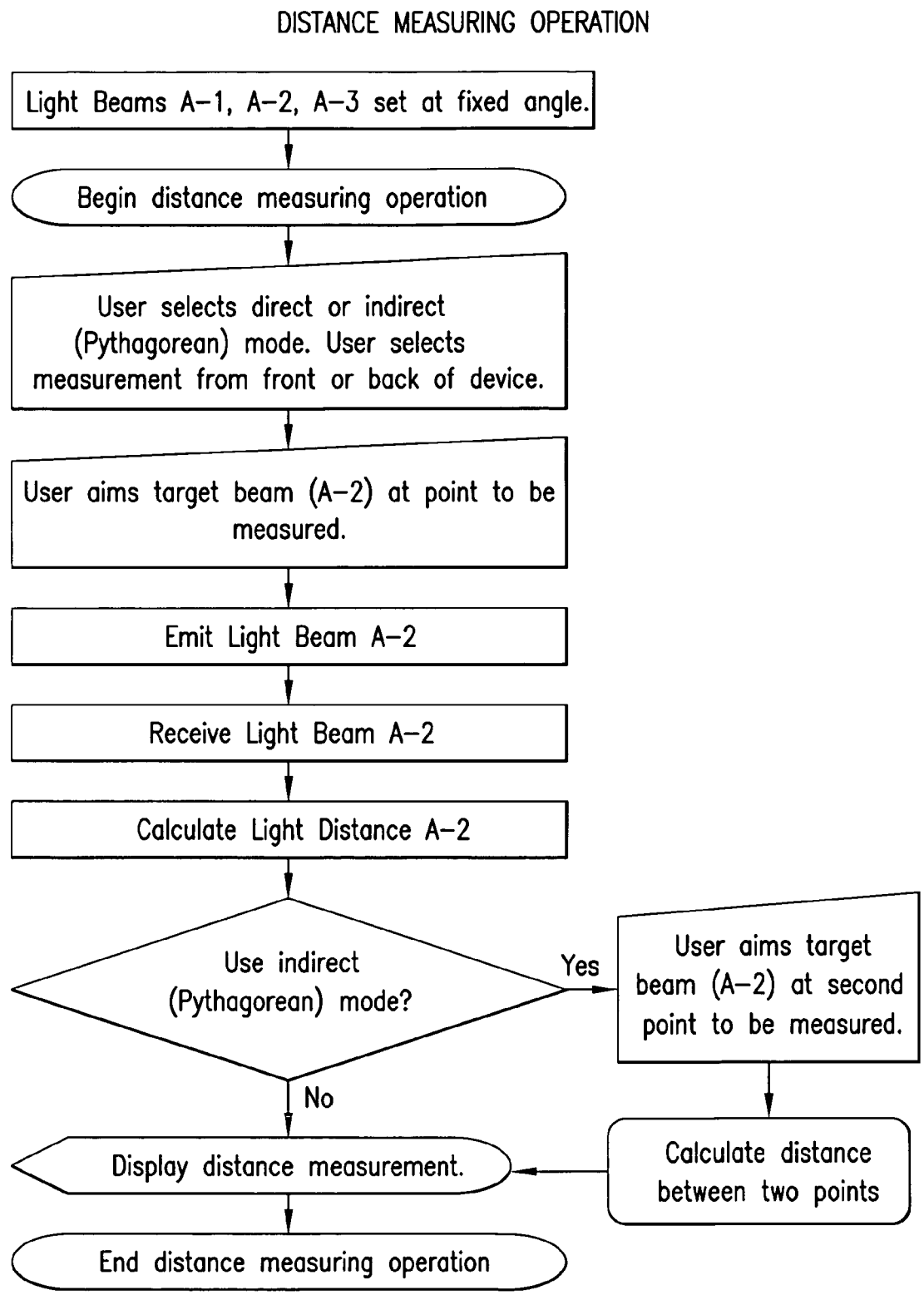
FIG. 3 is a flow diagram of the distance measuring operation of the device.

FIG. 3 illustrates the sequence of operation of the non-contact measurement device 100 to measure straight-line distance. The straight-line distance measurement may be taken from the front end of the housing of the device to a point on a surface, the rear end of the housing to a point on the surface or, alternatively, the measurement can be made between two remote points on a surface.

Figure 4:
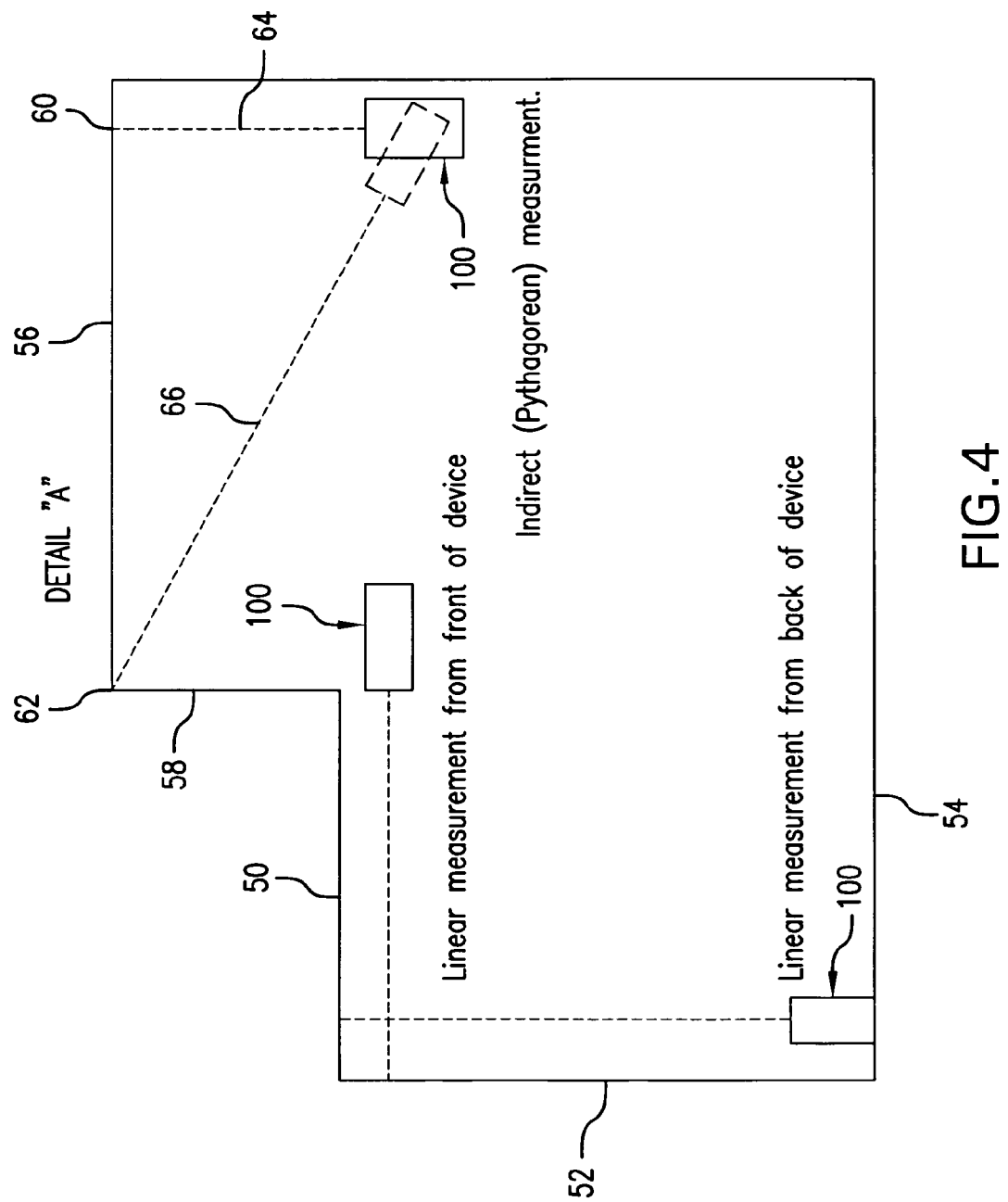
FIG. 4 is a general plan view illustrating various methods to measure straight-line distance between two points using the non-contact measurement device of the present invention.

FIG. 4 illustrates the three different linear measurement operations. For instance, the user can hold the front end of the device at an inside corner of a wall surface and direct the laser beam to an adjacent wall surface at the opposite end of the wall to determine the length of wall 50. On the other hand, if it is desired to determine the length of wall 52 which spans between walls 50 and 54, the user would place the back end of the device 100 against wall surface 54 and direct the laser beam onto the surface of wall 50. By selecting the mode of operation for measurement from the back end of the housing, the distance between the back end of the housing 110 of the device 100 and the wall surface 50 is measured, thereby indicating the length of wall 52 that spans between walls 50 and 54.

Another mode of straight-line distance measurement is shown in FIG. 4, wherein it is desired to measure between two points on a wall surface. This mode, known as the Pythagorean mode, requires the formation of a right angle triangle. This is achieved by directing one laser beam 64 from the device at an angle which is perpendicular (90°) to a point on the surface of the wall 56. The second straight-line distance measurement can be made by directing laser beam 66 at an angle towards the corner of the walls 56, 58, forming the hypotenuse of the right triangle. As seen in FIG. 4, a right triangle is formed by the two laser beam paths 64, 66 and wall surface 56. The distance between point 60 and point 62 on wall surface 56 can be determined using the Pythagorean Theorem. Specifically, the device of the present invention is able to measure the distance of legs 64 and 66 of the formed triangle. Having the measured distance of these two legs of the right triangle, the third leg of the triangle, between points 60, 62 on wall surface 56 is easily calculated by the processing unit of the device using the Pythagorean Theorem (i.e. $a^2+b^2=c^2$). The distance between point 60 and 62 on wall surface 56 is then displayed next to indicator E of the visual display.

Figure 5:
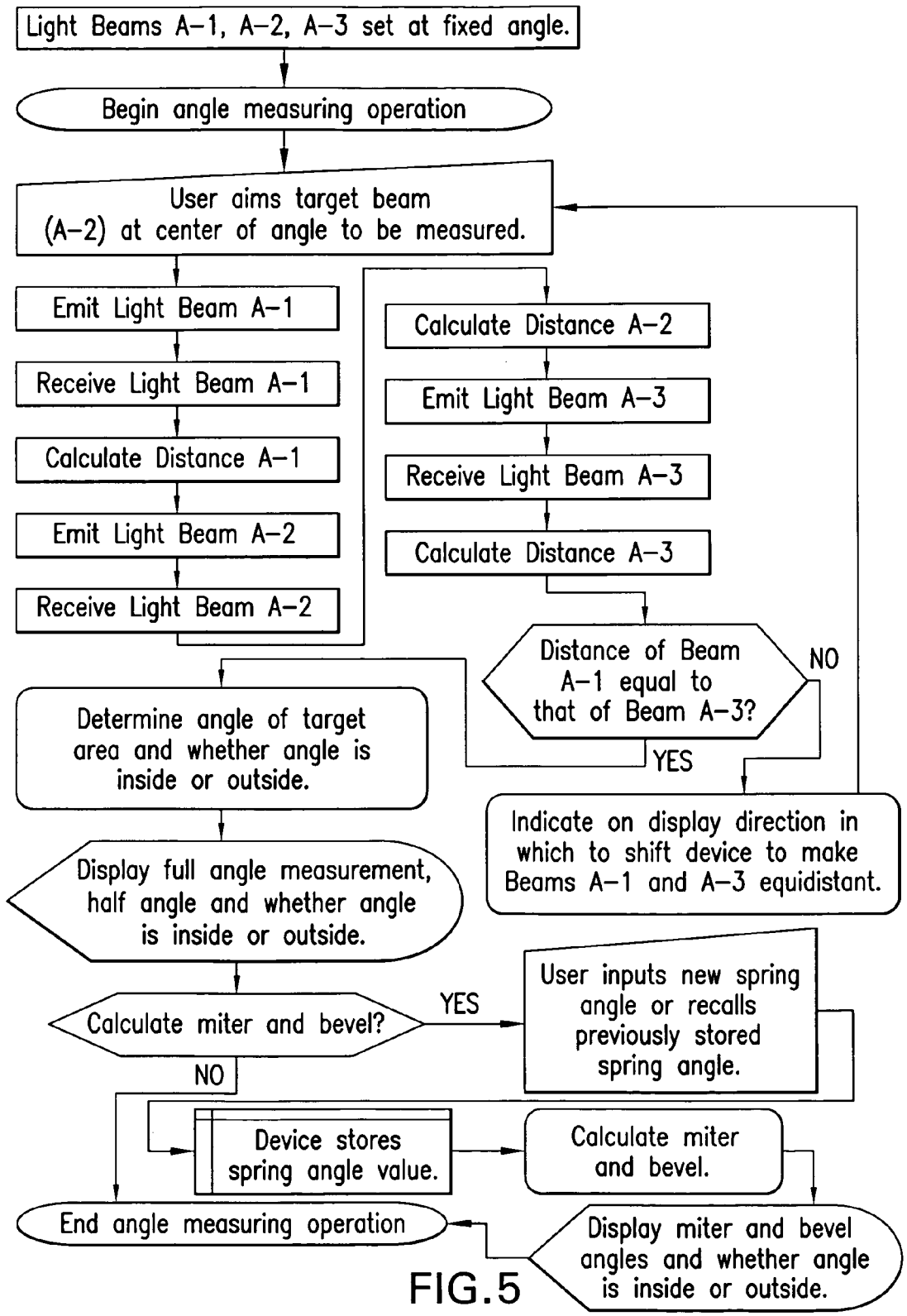
FIG. 5 is a flow diagram of the angle measuring operation performed by the non-contact measurement device of the present invention.
Figures 6A, 6B:
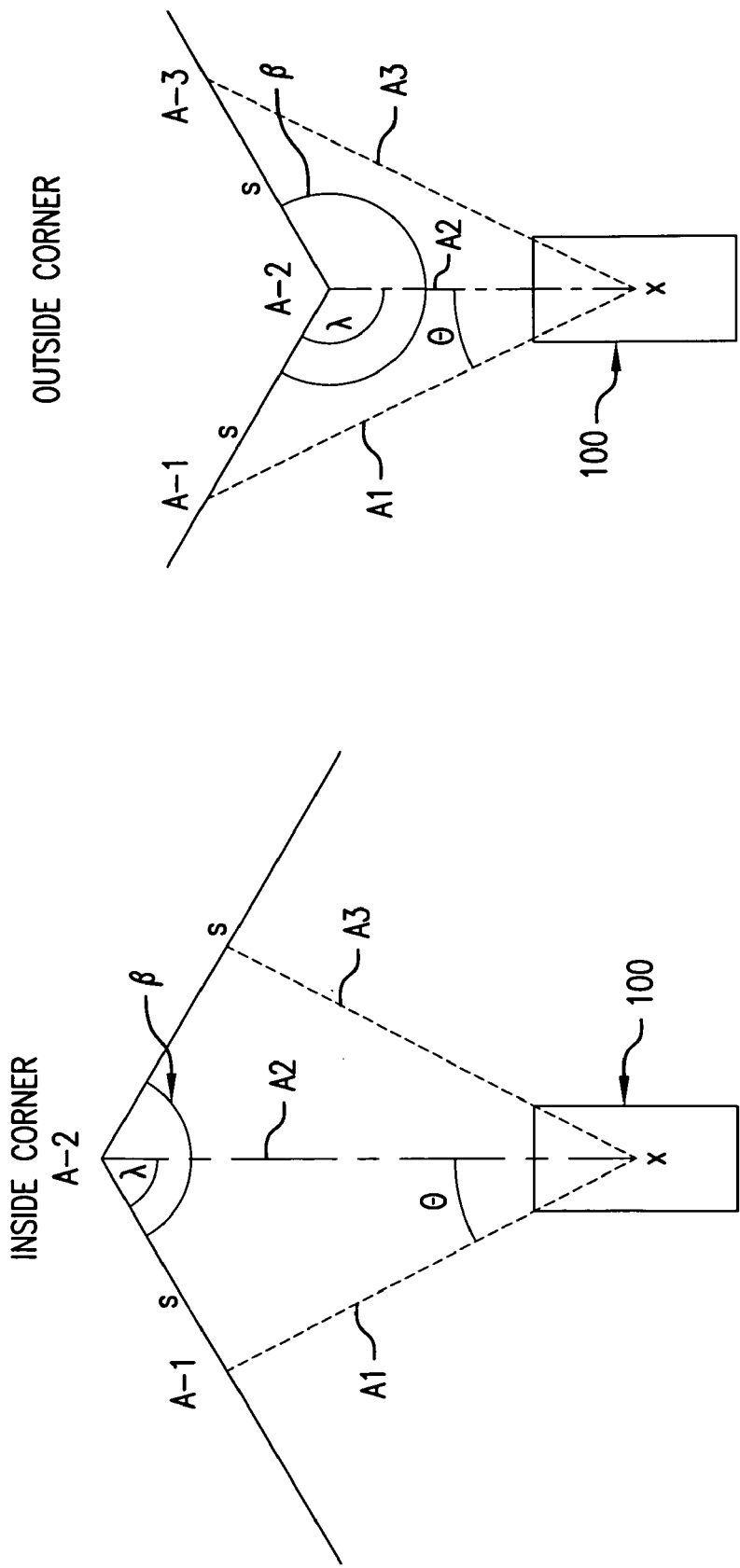
FIG. 6A is a general diagram illustrating use of the non-contact measurement device to measure an inside corner between two wall surfaces.
FIG. 6B is a general diagram illustrating use of the non-contact measurement device to measure an outside corner angle between two adjacent wall surfaces.

FIG. 5 shows a flow diagram depicting the angle measuring operation performed by the non-contact measurement device 100. As seen in FIGS. 6A and 6B, the device can be used to measure both the inside corner angle (i.e. less than 180°) as well as an outside corner angle (i.e. greater than 180°).

Referring to FIGS. 5 and 6A-6B, the angle measurement functions are performed as follows:

In the diagrams of 6A and 6B, the reference indictors have the following meanings:

"x"=point of convergence of beams "A1", "A2", and "A3".
"β"=full angle of target.
"λ"=half angle of target.
"θ"=angle between center beam (A2) and either one of side beams (A1 or A3).
"σ"=Spring Angle. (i.e. angle from wall to back of crown molding.)

Referring to FIGS. 5 and 6A-6B, the angle measurement functions are performed as follows:

Beams "A1", "A2" and "A3" are set at fixed angles from each other (θ). The processing unit is programmed to "know" that the three beams are set at fixed angles relative to each other. Additionally, the processing unit is programmed to "know" at which point beams "A1", "A2", and "A3" would converge (x) within the device (i.e. behind the laser components A-1, A-2 and A-3). To begin an angle measurement, the user targets the center of the angle with beam "A2". The device emits beams in sequence so as not to receive confusing readings from other beams. The display indicates in which direction to move the device until beams "A1" and "A3" are equidistant. Once properly centered, the device can perform the following functions:

a) Determine the distance from point "x" to points targeted by beams "A1", "A2", and "A3".

b) Find the length of side "s" using: $s^2 = \text{"A1"}^2 + \text{"A2"}^2 - 2\text{"A1"}\text{"A2"}\cos\text{"θ"}$ c) Find the angle "β" using: β=2λ

$$\cos\lambda = \frac{\text{"A1"}^2 - (s^2 + \text{"A2"}^2)}{-2(s\text{"A2"})}$$

$$\lambda = \cos^{-1}(\cos\lambda)$$

d) If cos λ is a negative value the device will indicate that "β" is an outside angle. If cos λ is a positive value the device will indicate that "β" is an inside angle.

If the spring angle ("σ") has been input or recalled from memory, then the device can calculate miter and bevel settings for crown moulding or many other applications requiring a compound angle. To obtain miter setting only, as with base mouldings or other flat materials, input "0" as spring angle. Use following to obtain desired values:

$$a) \text{ Miter} = \tan^{-1}\left(\frac{\tan(180-\beta)\cos\sigma}{2}\right)$$

$$b) \text{ Bevel} = \sin^{-1}\left(\frac{\sin(180-\beta)\cos\sigma}{2}\right)$$

Figure 7:
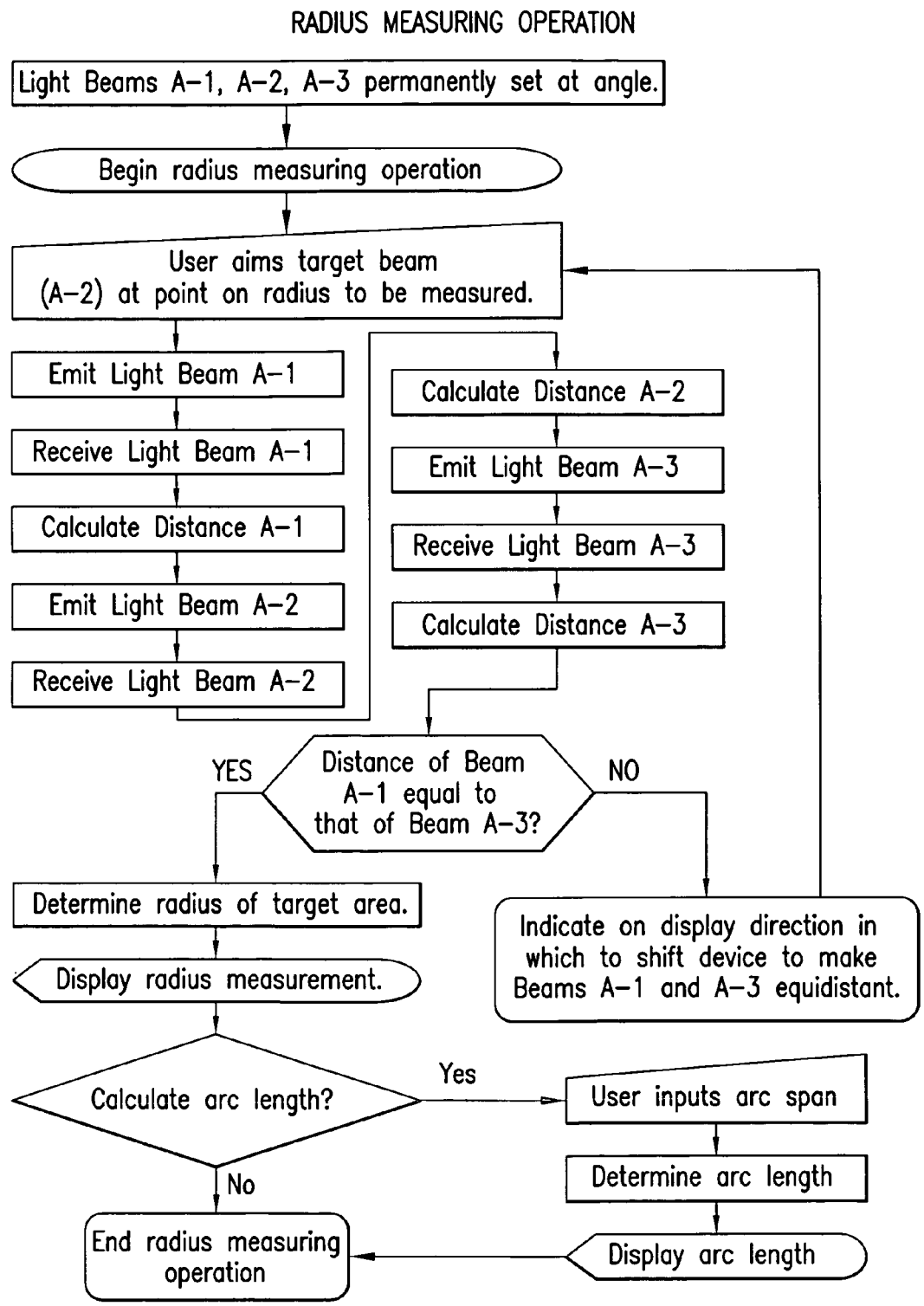
FIG. 7 is a flow diagram of the radius measuring operation performed by the non-contact measurement device of the present invention.
Figure 8B:
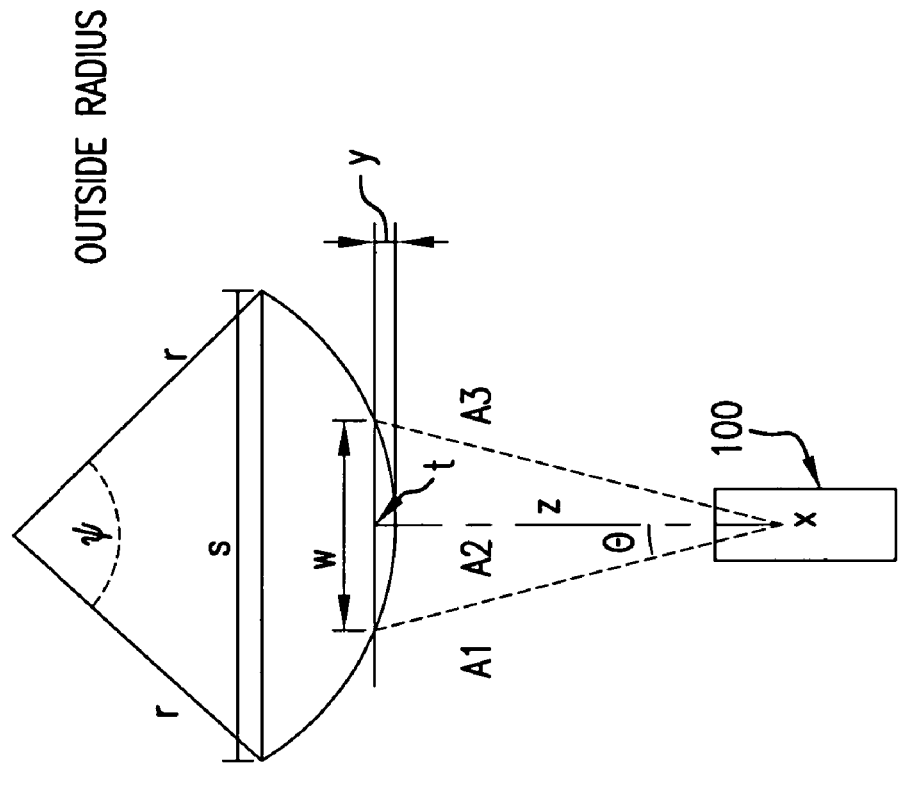
FIG. 8B is a general diagram illustrating use of the non-contact measurement device to determine the outside radius of a convex surface as well as the total arc length, the span of the arc, the straight-line distance between the two points along the arc and the distance between the imaginary line between the two points on the arc and the center of the arc segment between the two points.
Figure 8A:
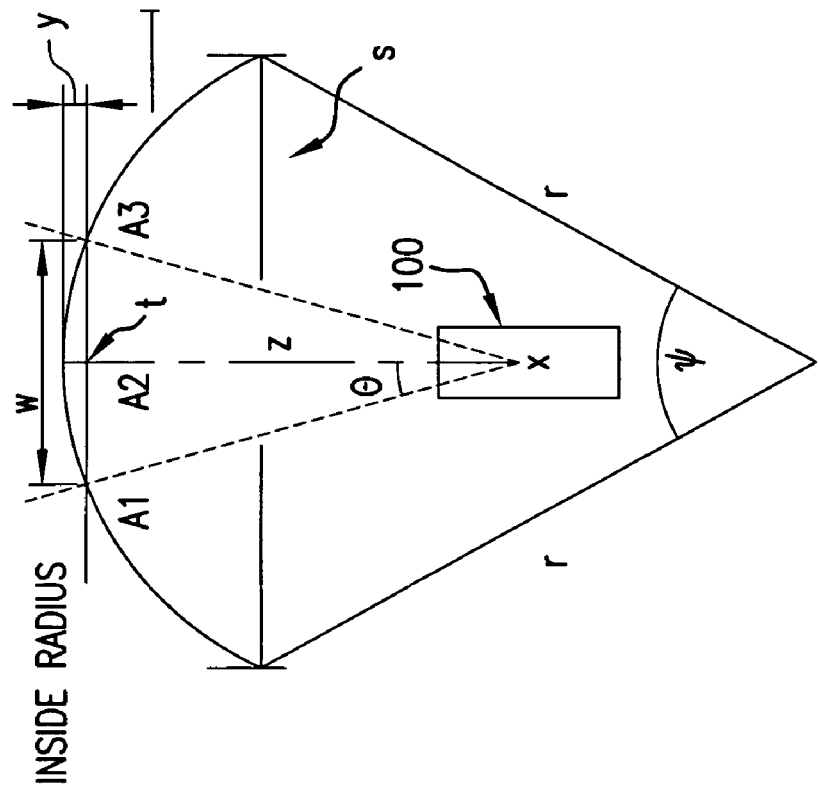
FIG. 8A is a general diagram illustrating use of the non-contact measurement device to determine the inside radius of a concave surface, as well as the arc length between two points of the surface, the total span of the arc, the straight-line distance between two points along the concave surface and the distance between the imaginary line between the two points on the arc and the center of the arc segment between the two points.

The radius measuring operation of the device is generally depicted in the flow diagram of FIG. 7. FIGS. 8A and 8B illustrate measurement of radius, arc length, arc span and other measurements of both an inside radius or concave surface (FIG. 8A) and an outside radius for convex surface (FIG. 8B). In referring to FIGS. 8A and 8B, the symbols shown therein have the following meaning:

"θ"=angle between center beam (A2) and either one of side beams (A1 or A3).
"Ψ"=angle formed by radii originating from center of circle and reaching extreme points of span of arc (s).
"l"=total length of arc
"r"=radius of arc.
"s"=total span (run) of arc.
"t"=point at which Beam "A2" intersects line "A1", "A3".
"w"=distance of imaginary line between points targeted by beams "A1" and "A3".
"x"=point of convergence of beams "A1", "A2" and "A3".
"y"=distance from point of intersection of beam "A2" with imaginary line that spans between the arc from the points of beams A1 and A3 on the arc to point where Beam "A2" hits the target on the arc.
"z"=distance from point of convergence (x) to above-mentioned intersection (β).

In operation, Beams "A1" and "A3" are set at a fixed angle off center beam "A2". The processing unit is programmed to "know" the angle at which the beams are set. The processing unit is programmed to "know" the point at which beams "A1", "A2", and "A3" would converge (x). To begin, the user targets an arc or circle section with the center beam A2. The device emits beams in sequence so as not to receive confusing readings from other beams. The display indicates in which direction to move device until beams "A1" and "A3" are equidistant. Once properly aligned, the device can perform the following functions:

a) Determine the distance from point "x" to points targeted by beams "A1", "A2" and "A3".

b) Determine distance "w" using the following formula: w+2 sin θ "A1"

c) Determine distance "y" using the following formula: y="A2"−z d) Determine distance "z" using the following formula: z="A1"/secθ e) Using the above information, the device can determine the radius of the arc using the following formula: r=(w²/8y)+y/2

(If "y" is a negative value, the device will determine the target surface to be an outside radius, store that determination to memory and convert "y" to a positive value.)

f) The Device displays radius and indicates whether it is an inside or outside radius.

g) With user input, direct linear measurement or the Pythagorean (indirect) measurement function, the device can determine the total span of an arc or circle.

h) Determine "Ψ" using:

$$\sin\Psi = \frac{w/2}{\text{"A1"}}$$

i) Convert "Ψ" from degrees to radians.

j) With input of total span of arc or circle, the device can determine total length of arc ("l") using: l=rΨ^R

OR

Determine the circumference ("C") of a circle using common formula: πd (where π=3.14 and d is the diameter)

k) In the "Area" mode, the device can determine the area of a circle using the well known formula: πr² (where π=3.14 and r is the radius)

l) In the "Volume" mode, the device can determine the volume of a cylinder by adding the height measurement in the well known formula: hπr²

While the invention has been shown and described in accordance with a preferred and practical embodiment thereof, it is recognized that departures from the instant disclosure are fully contemplated within the spirit and scope of the invention which is not to be limited except as defined in the following claims as interpreted under the doctrine of equivalents.

What is claimed is:

1. A handheld non-contact measurement device for determining measurements of a target structure, said device comprising:

a housing;

a visible display on said housing;

a plurality of control and input keys on said housing;

a plurality of laser emitter and receiver components within said housing and fixed in position relative to one another, including a first laser emitter and receiver, a second laser emitter and receiver, and a third laser emitter and receiver, each of said laser emitter and receiver components including:

a laser emitter diode structured and disposed for generating and emitting a laser light signal from said housing;

a laser emitter lens structured and disposed to focus the emitted laser light signal in a directed beam towards a selected point on the target structure;

a laser signal receiver structured and disposed for receiving the emitted laser light signals returning from the target structure after the emitted laser light signal beam hits the target structure;

a laser detector lens for directing the returning laser light signal to said laser signal receiver;

a programmable processor communicating with said visual display, each of said plurality of control and input keys, and each of said laser emitter and receiver components, and said programmable processor being structured and disposed to receive control commands entered with said plurality of control and input keys, and said processor being further structured and disposed to perform selected measurement calculations based on data received from the return laser light signals returning from the target structure, and said processor communicating with said display for visually displaying selected function, mode and measurement data on said display;

said first laser emitter and receiver is structured and disposed to emit and receive the laser light signal in a first directional laser beam, and said second laser emitter and receiver is structured and disposed to emit and receive the laser light signal in a second directional laser beam, and said third laser emitter and receiver is structured and disposed to emit and receive the laser light signal in a third directional laser beam;

said first laser beam, said second laser beam and said third laser beam have a common point of origin at a point of intersection based on a linear extension of said first, second, and third laser beams;

said first, second, and third laser beams are directed at angles relative to one another from said common point of origin so that the angle between each of the first, second and third laser beams is fixed and is a known factor in performing the measurement calculations;

said device being structured and disposed for determining straight line distance measurement between a selected position on said housing and a point on the target structure;

said device being further structured and disposed for determining straight line distance measurement between two points on the target structure;

said device being further structured and disposed for determining measurement of an inside angle between two surfaces on the target structure, and an outside angle between two surfaces on the target structure;

said device being further structured and disposed for determining arc length measurement between two points on the target structure;

said device being further structured and disposed for determining the radius of an arc on the target structure and the span measurement of an arc on the target structure; and said device being further structured and disposed for measuring the area of a circle and the volume of a cylinder on the target structure.

2. A handheld non-contact measurement device for determining measurements of a target structure said device comprising:

a housing;

a visible display on said housing;

a plurality of control and input keys on said housing;

a plurality of laser emitter and receiver components within said housing and fixed in position relative to one another, including a first laser emitter and receiver, a second laser emitter and receiver, and a third laser emitter and receiver, each of said laser emitter and receiver components including:

a laser emitter diode structured and disposed for generating and emitting a laser light signal from said housing;

a laser emitter lens structured and disposed to focus the emitted laser light signal in a directed beam towards a selected point on the target structure;

a laser signal receiver structured and disposed for receiving the emitted laser light signals returning from the target structure after the emitted laser light signal beam hits the target structure;

a laser detector lens for directing the returning laser light signal to said laser signal receiver;

a programmable processor communicating with said visual display, each of said plurality of control and input keys, and each of said laser emitter and receiver components, and said programmable processor being structured and disposed to receive control commands entered with said plurality of control and input keys, and said processor being further structured and disposed to perform selected measurement calculations based on data received from the return laser light signals returning from the target structure, and said processor communicating with said display for visually displaying selected function, mode and measurement data on said display;

said first laser emitter and receiver is structured and disposed to emit and receive the laser light signal in a first directional laser beam, and said second laser emitter and receiver is structured and disposed to emit and receive the laser light signal in a second directional laser beam, and said third laser emitter and receiver is structured and disposed to emit and receive the laser light signal in a third directional laser beam;

said first laser beam, said second laser beam and said third laser beam have a common point of origin at a point of intersection based on a linear extension of said first, second, and third laser beams;

said first, second, and third laser beams are directed at angles relative to one another from said common point of origin so that the angle between each of the first, second and third laser beams is fixed and is a known factor in performing the measurement calculations;

said device being structured and disposed for determining straight line distance measurement between a selected position on said housing and a point on the target structure;

said device being further structured and disposed for determining straight line distance measurement between two points on the target structure; and said device being further structured and disposed for determining measurement of an inside angle between two surfaces on the target structure, and an outside angle between two surfaces on the target structure.

3. A handheld non-contact measurement device for determining measurements of a target structure said device comprising:

a housing;

a visible display on said housing;

a plurality of control and input keys on said housing;

a plurality of laser emitter and receiver components within said housing and fixed in position relative to one another, including a first laser emitter and receiver, a second laser emitter and receiver, and a third laser emitter and receiver, each of said laser emitter and receiver components including:

a laser emitter diode structured and disposed for generating and emitting a laser light signal from said housing;

a laser emitter lens structured and disposed to focus the emitted laser light signal in a directed beam towards a selected point on the target structure;

a laser signal receiver structured and disposed for receiving the emitted laser light signals returning from the target structure after the emitted laser light signal beam hits the target structure;

a laser detector lens for directing the returning laser light signal to said laser signal receiver;

a programmable processor communicating with said visual display, each of said plurality of control and input keys, and each of said laser emitter and receiver components, and said programmable processor being structured and disposed to receive control commands entered with said plurality of control and input keys, and said processor being further structured and disposed to perform selected measurement calculations based on data received from the return laser light signals returning from the target structure, and said processor communicating with said display for visually displaying selected function, mode and measurement data on said display;

said first laser emitter and receiver is structured and disposed to emit and receive the laser light signal in a first directional laser beam, and said second laser emitter and receiver is structured and disposed to emit and receive the laser light signal in a second directional laser beam, and said third laser emitter and receiver is structured and disposed to emit and receive the laser light signal in a third directional laser beam;

said first laser beam, said second laser beam and said third laser beam have a common point of origin at a point of intersection based on a linear extension of said first, second, and third laser beams;

said first, second, and third laser beams are directed at angles relative to one another from said common point of origin so that the angle between each of the first, second and third laser beams is fixed and is a known factor in performing the measurement calculations;

said device being structured and disposed for determining measurement of an inside angle between two surfaces on the target structure, and an outside angle between two surfaces on the target structure;

said device being further structured and disposed for determining arc length measurement between two points on the target structure;

said device being further structured and disposed for determining the radius of an arc on the target structure and the span measurement of an arc on the target structure; and said device being further structured and disposed for measuring the area of a circle and the volume of a cylinder on the target structure.

\* \* \* \* \*